A. TEYSONNIERE.
Inkstands.

No. 148,999. Patented March 24, 1874.

Witnesses.
Michael Ryan
Frad. Hayne

Adolphe Teysonniere
by his Attorneys
Brown & Allen

AM. PHOTO-LITHOGRAPHIC Co. N.Y. (OSBORNE'S PROCESS.)

UNITED STATES PATENT OFFICE.

ADOLPHE TEYSONNIÈRE, OF PARIS, FRANCE, ASSIGNOR TO EDWARD MARSTON, OF LONDON, AND HENRY KLEINAN, OF WESTMINSTER, ENGLAND.

IMPROVEMENT IN INKSTANDS.

Specification forming part of Letters Patent No. 148,999, dated March 24, 1874; application filed December 9, 1873.

*To all whom it may concern:*

Be it known that I, ADOLPHE TEYSONNIÈRE, of Paris, France, but now residing at 18 King William street, in the city of Westminster, England, have invented certain Improvements in Inkstands, and in the mode of using soluble chemical substances therewith as writing-ink, of which the following is a specification:

The object of this invention is to provide an inkstand which shall be capable of yielding ink for a long period (say, several months) of a uniform color and quality, by the simple application thereto from time to time of pure water. This result is attained by the use of a dry pigment or coloring matter, soluble in water, which pigment, when inserted in the inkstand, will provide the source for a practically unlimited supply of ink. To insure, however, a satisfactory result, a peculiar construction of inkstand is provided, which will prevent the undissolved pigment from reaching the dipping cone or cup of the inkstand. This condition being secured, the form and arrangement of the inkstand may be indefinitely varied.

In the accompanying drawing, Figure 1 is an external elevation, and Fig. 2 a vertical section, of the form of inkstand preferred to be used in obtaining a practically exhaustless supply of limpid ink.

This inkstand consists of a metal case divided into two compartments, $a$ and $b$, by means of a perforated vertical partition, $c$. The soluble coloring matter or pigment is contained in a porous bag or envelope, $d$, made, by preference, of unsized paper, and it is placed in the compartment $b$. The metal cover of the inkstand is made with two openings, which are intended to give access to the two compartments $a$ $b$. Attached to the under side of the cover is a metal screen, $b^*$, which partially closes the opening to the compartment $b$, thus protecting it against the admission of dirt or dust, while a free passage is left for the supply of water to the compartment. Pendent from the cover is an inverted truncated cone, $e$, forming a dipping-cup, which projects down into the lower part of the compartment $a$. The two openings in the cover are closed, when required, by means of screw-caps $a'$ and $b'$. $e'$ is a sponge, inserted in the compartment $a$, for the purpose of keeping back from the dipping-cup any undissolved particles of the coloring matter or pigment which may escape from the envelope $d$.

When the case is fitted with a sponge, or equivalent filtering material, and the pigment is placed in the compartment $b$, the cover is secured in its place by solder or otherwise, and the inkstand is then ready for the market.

When it is required to use the inkstand it is only necessary to fill it, or partially fill it, with water, and leave it a short time for the water to act upon and dissolve out a portion of the incased pigment.

Upon pouring water into the compartment $b$ through the opening $b'$, part of the coloring matter contained in the sack or bag $d$ will be dissolved, and will pass through the partition $c$ into the compartment $a$, from whence the color or ink may be taken by dipping the pen into the cone $e$.

Fig. 3 is a vertical section of an inkstand, which is divided internally into two compartments, $a$ and $b$, by means of the perforated horizontal partition $c^1$, covered with a piece of felt, or other porous fabric, which acts as a filtering or straining medium. In this case the compartment $b$, containing the coloring matter, is above the partition, and the ink-chamber is below the partition, and the dipping-cone opens into the compartment $a$, which contains the filtered ink.

Fig. 4 is a vertical section representing a modification of Fig. 3. In this example the solid coloring matter is placed in the lower compartment $b$, and access thereto, for the purpose of adding water when required, is obtained by means of the narrow truncated cone $f$. The dipping-cone $e$ is open to the upper compartment $a$, into which the ink filters.

Fig. 5 is another modification, in which the perforated partition is dispensed with, so that there is only one chamber; but, in order to prevent the ink from becoming thick or muddy in the dipping-cone $e$, the lower end thereof is closed by a perforated disk and piece of sponge, $c^2$.

Fig. 6 is a modification of Fig. 5. In this instance, in place of the perforated disk and piece of sponge $c^2$, the open end of the dipping-cone $e$ is covered with a porous bag, $c^3$, which acts as the straining or filtering medium. It will, moreover, be seen that in this instance there is only one opening in the cover of the case, the water to dissolve the coloring matter being supplied through the dipping-cone $e$; but an additional opening may be provided, if required.

Figure 1:
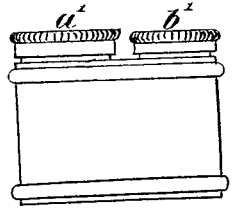
Figure 2:
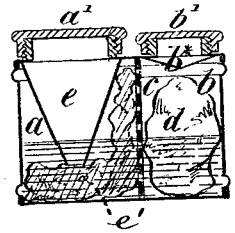
Figure 3:
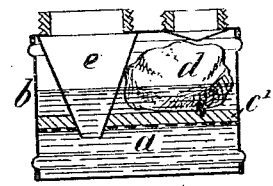
Figure 4:
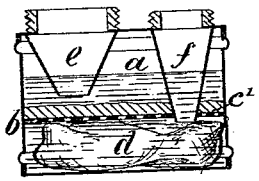
Figure 5:
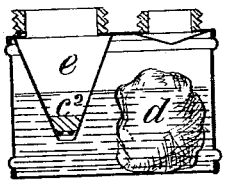
Figure 6:
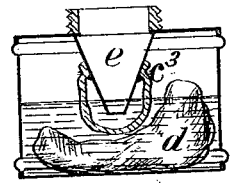
Figure 7:
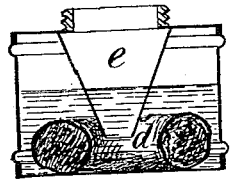
Fig. 7 is another modification, in which a separate filtering medium, adapted to the dipping-cone, is altogether dispensed with. The water to dissolve the coloring matter is poured into the chamber through the dipping-cone $e$, as in Fig. 6, and the coloring matter is contained in a long bag or sack, $d$, made of some woven or felted material which will act as a filtering medium.
Figure 8:
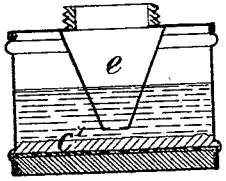
Fig. 8 is another modification, in which the solid coloring matter is not inclosed in any envelope, but is placed loosely at the bottom of the chamber, and is covered up by a perforated metal disk, $c^1$, and a layer of felt, sponge, or other filtering medium, as at $c^1$, Fig. 4.
Figure 9:
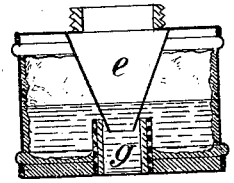
Fig. 9 is a modification of Fig. 8, with this difference, that in place of putting the coloring matter in a loose pulverulent state in the vessel, it is caused to adhere to the bottom and sides of the vessel by deposition from a concentrated solution.

To this end, before fixing on the cover, the vessel is filled with a concentrated solution of the coloring matter—say aniline, for example, which is then evaporated to dryness. Another, and sometimes a third and fourth, supply of the liquid is in like manner supplied and evaporated, until a sufficient quantity of the solid coloring matter has become deposited on the bottom and sides of the vessel; or the coloring matter, in a state of powder or in a granulated state, as it is sold, may be made to adhere to the sides of the vessel by first coating the same with a gummy solution and then applying thereto the dry aniline pigment. At the bottom and central part of the vessel is placed a shallow tube or ring, $g$, which, if desired, may be made porous, so as act as a filtering or straining medium.

It is preferred to construct this shallow dipping-chamber in this manner, so as to act as a strainer, but a simple glass or metal ring may be cemented at the bottom of the vessel to form a dipping-chamber, and to prevent the thick muddy parts of the ink from getting into the dipping-cone.

The manner of employing the invention is as follows: Water is poured into the compartment containing the solid coloring matter, which will be partially dissolved until the water is completely saturated with the color. The solution will pass through the filtering or straining mediums, and, after filtration, will rise up inside the dipping-cone $e$, into which pens may be dipped to take up the ink. When all the liquid is used, more ink may be made by simply pouring more water into the compartment containing the coloring matter, and thereby dissolving more of the aniline or other coloring matter. Water may be added in this manner dozens of times, and will thus continue to supply ink for months until all the aniline or other solid coloring matter is dissolved. For this reason the inventor intends to name this apparatus, "The Magic Inexhaustible Inkstand."

From the above description, it will be evident that the form of the inkstand may be varied *ad infinitum*, while the principle of the invention is retained, which is, that the solid soluble coloring matter, whatever it may be, should be confined or arranged in such a way that while water can be supplied to dissolve it, only the perfectly dissolved parts can pass through the filtering medium or be allowed to enter the dipping-chambers.

The soluble coloring matters which may be used for the purposes of the invention are, by preference, aniline, (all colors,) but ink-powders or any ordinary ink evaporated to dryness or to a suitable consistency, evaporated extracts of dye-woods, or soluble dyes may be used. Indigo, Prussian blue, and other intense coloring matters which are soluble in water may also be employed, but aniline colors are preferred, as they have been found in practice best adapted for the purposes of the invention.

Having now set forth the nature of my invention of improvements in inkstands and in the mode of using soluble chemical substances therewith as writing-ink, and explained the manner of carrying the same into effect, I wish it to be understood that I claim—

An inkstand, having a compartment for containing a pigment or coloring compound, a chamber for receiving and containing a supply of water, a dipping-cone, and a filter for straining the ink prior to its advance into said dipping cone or cup, substantially as herein described, and for the purpose specified.

London, September 12, 1873.

A. TEYSONNIÈRE.

Witnesses:
 H. K. WHITE,
 A. BISHOP.
  66 *Chancery Lane, London.*